March 28, 1967 A. MANCUSO 3,310,843
PRE-HEATER FOR MOLDING MATERIAL
Filed March 30, 1965 2 Sheets-Sheet 1
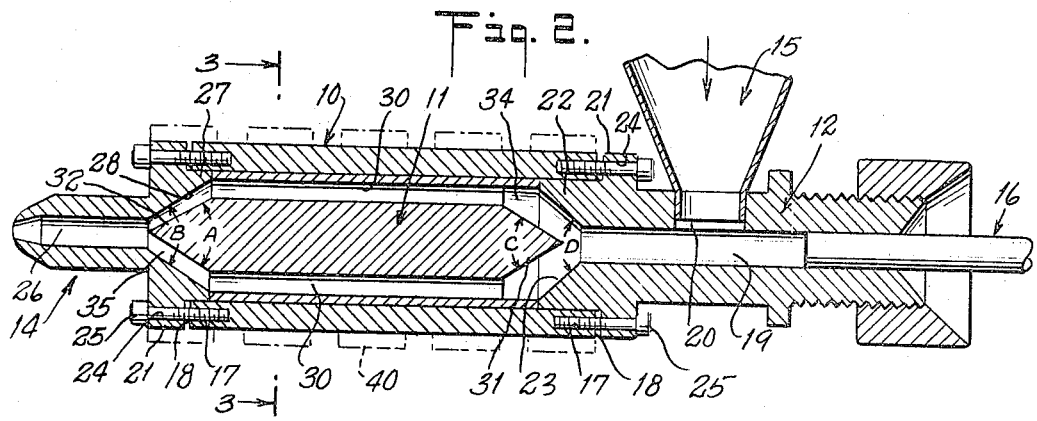
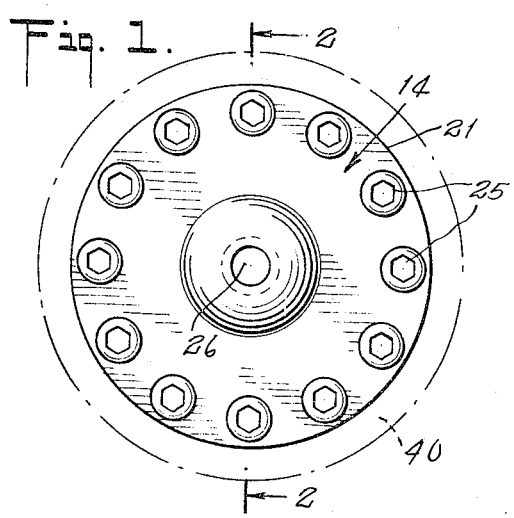
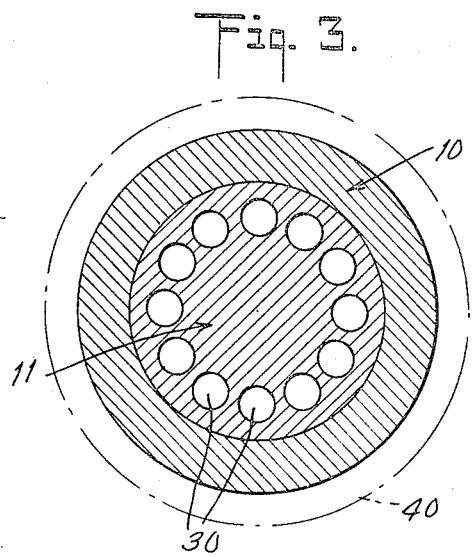
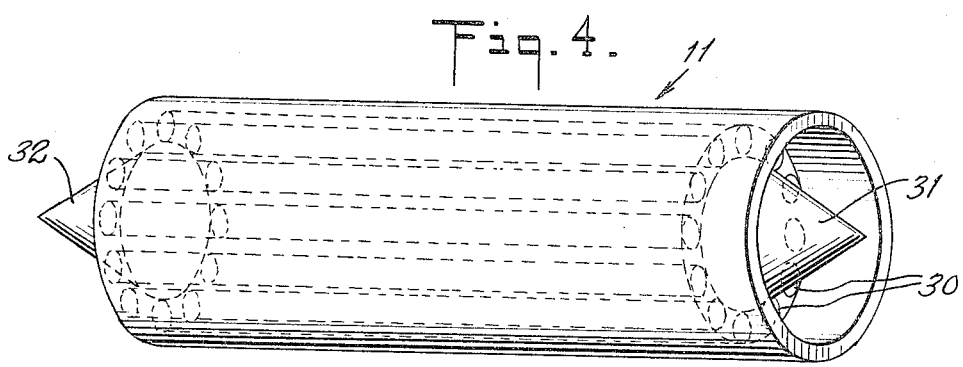
INVENTOR.
ARION MANCUSO
BY Krazinski & Nolan
ATTORNEYS March 28, 1967   A. MANCUSO   3,310,843
PRE-HEATER FOR MOLDING MATERIAL
Filed March 30, 1965   2 Sheets-Sheet 2

INVENTOR.
ARION MANCUSO
BY
ATTORNEYS

United States Patent Office 3,310,843
Patented Mar. 28, 1967

3,310,843
PRE-HEATER FOR MOLDING MATERIAL
Arion Mancuso, North Valley Stream, N.Y., assignor to Ilikon Corporation, Natick, Mass., a corporation of Delaware
Filed Mar. 30, 1965, Ser. No. 445,861
8 Claims. (Cl. 18—30)

The present invention relates to the molding of articles from materials such as plastic resins, rubber and the like and, more particularly, to an improved heat exchanger for heating and plasticizing the material before delivery to a mold.

This application is a continuation-in-part of my copending application Ser. No. 327,612, filed Dec. 3, 1963, and now abandoned, which is assigned to the assignee of the present invention.

The heat exchangers heretofore utilized for the foregoing purpose have had the disadvantage that the heat transfer was not sufficiently uniform to properly pre-heat and plasticize charges of the material throughout. One result of the non-uniform heating of the charge was that the portions of the plastic material closest to the heat source would be thermally degraded when sufficient heat was supplied to those portions of the plastic material which were at a distance from the heat source. This thermally degraded plastic material caused undesirable defects and relatively high rejection rates in articles made from it.

Additionally, injection pressures of 20,000 pounds or more were commonly required with prior heat exchangers. Consequently, portions of individual charges of the material when delivered to the mold were at different temperatures and of different plasticity which caused difficulty in the molding operation and created defects in the molded articles. Such difficulties particularly are encountered in the molding of relatively thin-walled structures such as bottles and jars formed in a blow mold.

Another reason for the defects in molded articles made from material plasticized in known pre-heaters was the presence of voids resulting from the entrapment of air in the melted plastic, and from the presence of unplasticized resin particles resulting in a non-uniform melt.

Accordingly, an object of the present invention is to provide an improved pre-heater and plasticizer for molding materials which is not subject to the foregoing difficulties.

Another objection of my invention is to provide such a pre-heater which minimizes the thermal degradation of the material which it is used to plasticize, thereby improving the quality of plastic articles made from such material.

Another object of my invention is to provide a pre-heater of the type described which produces a plastic melt from solid plastic material, the melt having fewer voids therein as the result of the absence of bubbles of entrapped gases, thereby producing plastic articles which are substantially free of defects caused by the presence of such voids in the melt.

Another object of my invention is to provide such a pre-heater which has a high heat exchange capacity and divides the charges of molding material in a manner to uniformly heat and plasticize the material.

Another object of my invention is to provide such a pre-heater which operates to perform its intended function with a lower heat input than heretofore required.

A further object of my invention is to provide such a pre-heater which operates at lower injection pressure than heretofore required and which is characterized by a shaped passage for the introduction of molding materials into the heat exchange passageways.

A still further object of my invention is to provide such a pre-heater which can be readily taken apart for inspection, cleaning and repair.

Yet a further object of my invention is to provide such a pre-heater which is simple, practical and economical in construction, and is reliable in operation.

Other and further objects of my invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects generally are accomplished by dividing a flowing charge of molding material and causing the same flow through a plurality of passageways while applying heat to the material, and combining the charge after passing through the passageways before delivery to the mold. The passageways are formed in thermally conducting material and their size is chosen to achieve a compromise between high surface to volume ratio and low back pressure.

The division of the molding material is effected in a non-uniform funnel-shaped inlet passage of varying cross-sectional area which permits proper initial preheating and plasticizing of the charge at low injection pressures before the material is caused to flow into the heat exchange passageways and which also permits gas entrapped in the material to escape from it before the material flows through the heat exchange passages. The material is raised to the proper uniform temperature and plasticizing molding condition within the heat exchange passageways. The divided material is then re-combined in a non-uniform funnel-shaped outlet passage before passing through an exit opening and delivery to the mold.

The cross sectional area of the outlet passage through which the plasticized material flows diminishes in size from the inlet end of the outlet passage to the exit opening or nozzle through which the plasticized material is injected into the mold. This reduction size is substantial and is believed to account in part for the absence of voids resulting from entrapped gases in the material extruded through the exit nozzle. The combination of the shaped inlet and output passages and a plurality of heat exchange passageways of appropriate diameter disposed between these passages permits lower injection pressures and working temperatures to be employed in preparing molding material for mold delivery and additionally results in a melt which has fewer defects or voids therein and is uniformly plasticized. Such features result in higher production rates and the formation of good quality blown articles substantially free of strain and streaks.

A preferred embodiment of the invention has been chosen for purposes of illustration and description and is shown in the accompanying drawing forming a part of the specification, wherein:

FIG. 1 is an end view of a pre-heater in accordance with the present invention, as seen from the left in FIG. 2.

FIG. 2 is a longitudinal sectional view taken along the line 2—2 on FIG. 1.

FIG. 3 is a sectional view taken along the line 3—3 on FIG. 2.

FIG. 4 is a perspective view of a one piece flow dividing, heat exchanging and flow combining element embodied in the pre-heater.

Figure 5:
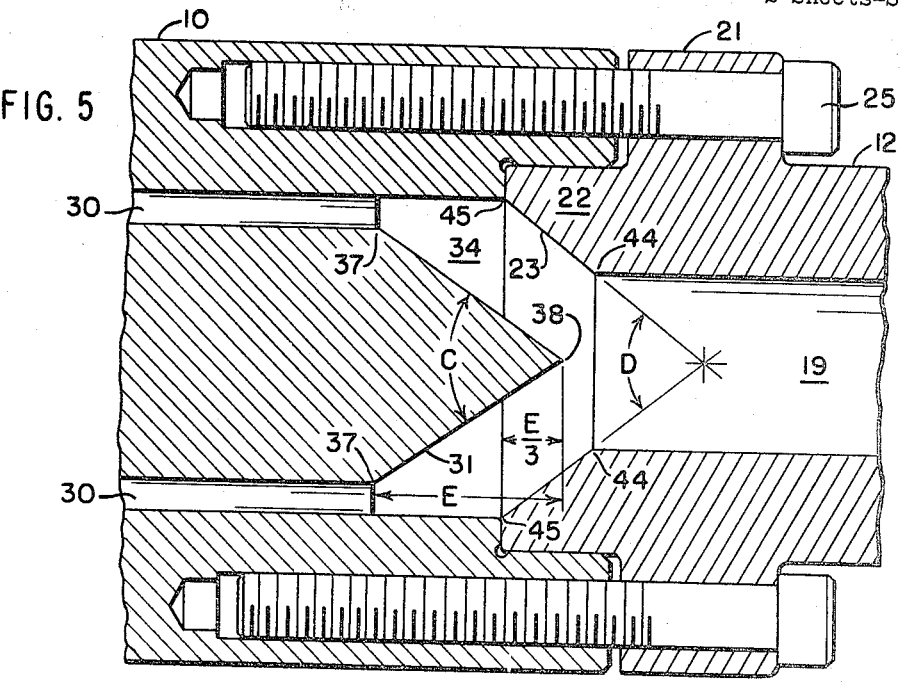
FIG. 5 is an enlarged fragmentary sectional view of the inlet portion of the pre-heater as shown in FIG. 2.

Referring now to the drawing in detail, apparatus is shown which generally comprises a body 10, a heat exchange and flow controlling element 11 (FIG. 4) in the body, an inlet member 12 at one end of the body, an outlet member 14 at the other end of the body, a hopper 15 for supplying molding material to the inlet member 12, and a reciprocating ram 16 for causing charges of the molding material to flow through the inlet member, the heat exchange element and the outlet member.

The body 10 is a cylindrical tube of sufficient wall thickness to form screw threaded openings 17 in the end faces 18 of the tube. The element 11 is preferably fabricated from a single stock of metal or other hard heat exchange material. A one-piece torpedo element 11 avoids many of the difficulties associated with torpedoes in conventional pre-heaters. Thus, expansion and contraction of multipiece torpedo elements permits the spaces between the pieces forming the torpedo to fill with liquefied plastic material. The presence of this material adversely affects heating efficiency. The one piece element is also advantageous in that it provides for self cleaning of the element without removal from the body 11 by injecting cold material to clear the passageways.

The inlet member 12 has a central bore 19 extending longitudinally therethrough which is formed with an upper side opening 20 for receiving the delivery end of the hopper 15. The inner end of the bore 19 communicates with the interior of the body 10, and the outer end of bore 19 has the ram 16 inserted therein for forcing molding material, delivered by the hopper to the bore, towards the body.

The inner end of the inlet member 12 has a flange 21 overlying the body end face 18, and a tubular section 22 inserted within the body and having a downstream diverging conical surface 23. The flange 21 is formed with a plurality of apertures 24 facing the openings 17 and having bolts 25 extending therethrough and threaded into the openings 17 for effecting removable securement of the inlet member 12 to the body 10.

The outlet member 14 has a central bore 26 extending longitudinally therethrough, the inner end of which communicates with the interior of the body 10 and the outer end of which is adapted for connection to the inlet of a mold (not shown).

The inner end of the outlet member 14 also has a flange 21 overlying the body end face 18, and has a tubular section 27 partially inserted within the body and having a downstream converging conical surface 28. The flange is formed with a plurality of apertures 24 facing the openings 17 in the left hand end of the body member 10 (as seen in FIGURE 1) and having bolts 25 extending therethrough and threaded into openings 17 for effecting removable securement of the outlet member 14 to the body 10.

The heat exchange element 11 is cylindrical to enable the same to be removably fitted in the body 10, and has its ends engaged by the tubular sections 22 and 27, respectively, to position the element in the body.

In furtherance of the present invention, the element 11 has a plurality of passageways 30 extending longitudinally therethrough and communicating with the inlet bore 19 and the outlet bore 26 at their respective ends. Preferably, the passageways 30 are annularly arranged and are close to the periphery of the element 11, whereby a maximum number of passageways of a given diameter may be provided with the passageways close to an external heat source. It has been found that the passageways should not be greater than about ½ inch in diameter nor less than about ¼ inch in diameter with a preferred value being about ⅜ inch in diameter. In order to prevent degradation of the molding material as it flows through the passages 30, the thermal gradient at the side walls of the passages should be as small as possible. To accomplish a given amount of heating the heated surface S to which the molding material is exposed should be as large as possible as compared to the volume V of plastic material being heated or stated another way the ratio $S/V$ should be as large as possible. The total heating surface for one of the passages 30 is given by:

$$S = \pi d \times L$$

where: $d$ is the passage diameter and L is the passage length.

The volume of the same passage thus is:

$$V = \frac{\pi d^2}{4} \times L$$

and the ratio $S/V$ for a given passage is $4/d$.

From this it is seen that the diameter $d$ of the passage should be made as small as possible to minimize degradation of the plastic material by increasing the surface to volume ratio. With a high surface to volume ratio, the passage wall may be at a relatively lower temperature and still accomplish adequate heating of all the material in the passage. This means that the material adjacent the passage wall is subjected to a less drastic thermal history and the products produced from the melt have enhanced strength. However as the diameter of the passages is progressively decreased, I have found that the force required to move the material through the passage becomes very high for small diameters due to frictional forces in the small passages. In practice, I have found that the passage sizes set forth above represent a good compromise between obtaining a high surface to volume ratio and yet providing a sufficiently large passage so that the force required to cause the material to flow through the passage is not excessive.

I have also found that the annular arrangement of the passageways 30 circumferentially equidistant about the center of the element 11 is desirable. Good heating efficiency is obtained when the center of the passageways 30 is disposed at a distance from the center of the tubular element 11 equal to one half the radius from the longitudinal center of the element 11 to the outer surface of the surrounding tubular body 10.

Figure 6:
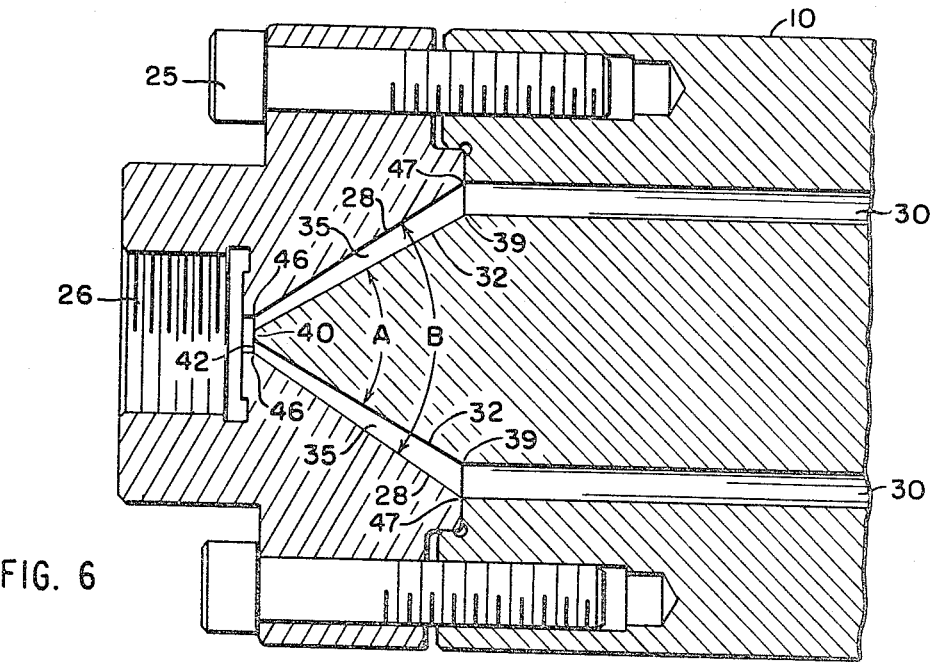
FIG. 6 is an enlarged fragmentary sectional view of the outlet portion of the pre-heater as shown in FIG. 2.

As best seen in FIGURE 5, the inlet end of the element 11 has a central upstream converging conical surface 31 extending from the base of the central cone 37 to the cone apex 38, the surface 31 facing the surface 23 of the element 12. As illustrated in FIGURE 6 the outlet end of the element 11 has a central downstream converging conical surface 32 extending from the base of the central cone 39 to the rounded cone apex 40, the surface 32 facing the surface 28. The surfaces 23 and 31 and the surfaces 28 and 32 are dimensioned and arranged to provide annular funnel-shaped passages 34 and 35 at the inlet and outlet ends of the passageways 30, respectively. The passage 34 diverges downstream in a particular manner to spread the molding material for entry into the passageways 30, and to permit air entrapped in the molding material to escape into the bore 19. The passage 35 converges downstream to combine the material leaving the passageways 30 into a single stream for discharge into the bore 26 through an outlet opening 42.

It should be noted that the conical surfaces 23 and 28 are non-parallel to their respective opposing surfaces 31 and 32 and so form passages 34 and 35 whose cross-section varies. This variation in cross-section, particularly in the passage 35, is an important feature of my invention as will be explained more fully below.

As shown in FIGURE 5, the surface 23 extends from the corner 44 of the bore 19 to the juncture of the cone and the interior cylindrical surface of the member 11, this juncture being labeled 45, in a straight line, the surface 23 being the surface of the frustrum of a cone whose included angle is D. The inlet cone has an included angle C and the angle C is less than the angle D. I have found that the included angle C of the inlet cone should be sufficiently great so that the apex of the cone 38 will withstand the injection pressures of 7000 to 12,000 pounds applied by the ram 16. Angles of from about 45 to 80 degrees are usually sufficient for this purpose. I have found that for most materials optimum results are achieved when the angle C is approximately 68° and the angle D is about 76°.

The inlet cone of the member 11 is positioned so that about ⅓ of the height E of the cone extends upstream of the plane defined by the juncture 45 (as shown in FIGURE 5) for rigid molding materials such as styrene and acetates. About one half of the inlet cone should project beyond this plane for softer molding materials such as polyethylene and polypropylene.

It will be observed that with the construction indicated, the passage through which the material passes gradually increases in cross-section as the material leaves the bore 19 and enters the passage 34. This gradual increase in cross-section continues until the material passes the plane which includes the juncture of the surface 23 and the inner cylindrical wall of the member 11, and thereafter it diminishes gradually. When the material reaches the right hand end of the passages 30 (as seen in FIGURES 1 and 5) there is a sharp diminution in cross-section, depending on the number and size of the passages. As previously noted, the size of the passages 30 should be between ½ and ¼ inch in diameter, with about a ⅜ inch diameter being preferred. I have found that the number of passages should be selected so that the total cross-sectional area of the passages is less than 60 percent of the cross-sectional area of the bore 19, with about 45 percent of the cross-sectional area being preferred.

A cross-sectional area of the passages 30 which is 60 percent of that of inlet bore 19 accounts for the difference in volume of material resulting from the fact that the material is in particulate form when in the bore 19 but is essentially a liquid when in the passages 30. A further reduction in cross-section is desirable to provide a back pressure at the inlet end of the passages 30 to push air which may be entrained in the particulate or semi-liquid stream back into the relatively large cross-sectional area of passage 34.

The fact that passage 34 diverges before converging to the end face of passages 30 also reduces to some extent the force required to operate plunger 16.

The downstream end of the pre-heater includes a converging funnel-shaped passage formed by the surface 32 on the member 11 and the surface 28 formed in outlet member 14. The surface 32 is the outer surface of a conical portion formed at the downstream end of the member 11, the cone having an included angle A. The opposing surface 28 which cooperates to form the passage 35, is also the surface of cone having an included angle B. As shown, the angle B is greater than the angle A so that the passage 35 diminishes in total cross-sectional area in a downstream direction both because of the reduced diameter of the passage and because of the non-parallel side walls, finally terminating in an exit orifice 42 which is preferably quite small. In practice, I have found that the cross-sectional area of the exit orifice should be of the order of 1/40 the cross-sectional area of the inlet bore 19. It is believed that this relatively small exit orifice thoroughly mixes the now liquid plastic material while subjecting it to a substantial shear stress field. This high shear stress field causes the material to "densify." The densification results from the fact that void defects in the liquid plastic coalesce as the material approaches the exit orifice because of the high shear stress field and these defects also come to the surface where they may escape from the material upon ejection from orifice 42 into the bore 26. Thus, the material supplied to the base 26 is substantially free of these void defects which were present in plastic materials supplied by prior pre-heaters.

The included angle A of the outlet cone may be less than that of the angle C associated with the inlet cone since there is no injection pressure against the conical surface 32. I have found that for all molding materials, other than rubber or rubber-like compounds, the angle A is desirably about 60° and the angle B, 68°. For rubber and rubber-like compounds the angle A is desirably about 50° and the angle B about 70° to provide a passage having a somewhat greater cross-section at any given point, but one whose cross-sectional area diminishes more sharply as the material proceeds toward the exit nozzle 42.

The heat exchange member 11 preferably is constructed of a metal of the kind which is both corrosive and erosive resistant to the molding material and which has good heat conductivity. The body 10 and the inlet and outlet members 12 and 14, respectively, may be constructed of any suitable structural material, such as aircraft steel.

Heat is supplied to the heat exchanger by suitable heating units 40 shown schematically and being mounted on the body 10. Such units may be of the steam heated, or electrical resistance or inductance heating type.

In using a conventional pre-heater, a four to six ounce charge of nylon molding compound is heated by elements set to provide heat at 580°–600° F. However, in preheating such charges with the apparatus in accordance with the present invention, the material was heated and plasticized homogeneously throughout by heat supplied at 500°–540° F.

From the foregoing description, it will be seen that the present invention provides a simple, compact, economical and reliable pre-heater for processing molding material. In particular, the pre-heater of my invention provides liquid plastic material which may be used to make blown plastic articles which are substantially free of defects resulting from thermal degradation of the plastic material in the pre-heater from the presence of void defects resulting from entrapped air, and from non-uniformly plasticized resin. As has been explained these results are achieved because of the conformation of the inlet and outlet passages to the heater taken in conjunction with the selection of the size and number of the heat exchange passages. Additionally, the pre-heater of my invention can be readily taken apart for inspection or cleaning and for interchange of the heat exchange element and the inlet and outlet members to vary the inlet and outlet passage cross-sectional areas and angles.

As various changes may be made in the form, construction and arrangement of the parts herein, without departing from the spirit and scope of my invention and without sacrificing any of its advantages, it is to be understood that all matters are to be interpreted as illustrative and not in any limiting sense.

What I claim is:

1. Apparatus for preheating a free flowing molding material which apparatus comprises, in combination:
    an elongated body member,
    an elongated heat exchange member enclosed within said body member and in heat exchange relationship therewith, said heat exchange member having a plurality of annularly arranged passageways for carrying said molding material extending therethrough and having first and second cones axially disposed at the inlet end and at the outlet end respectively of said member;
    an inlet member secured to the inlet end of the body member and having a material inlet passageway for directing molding material into the passageways of the heat exchange member, said inlet member also having a conical inner surface facing but spaced from the conical surface of the first cone to thereby form a portion of said material inlet passageway the included angle of said first cone being less than the included angle of the cone defined by the conical inner surface of said inlet member;
    an outlet member secured to the outlet end of the body and having an outlet passageway for the discharge of heated and plasticized molding material from the heat exchange passageways, said outlet member having a converging conical inner surface facing the conical surface of the second cone to provide a funnel-shaped annular passage converging in cross-section from said heat exchange member and leading to said outlet passageway, the included angle of said second cone being less than the included angle of the cone defined by the conical inner surface of said outlet member, said funnel-shaped passageway terminating in an outlet orifice of small cross-sectional area compared to the cross-sectional area of the inlet passageway to said heat exchange member; and means for heating said heat exchange member.

2. The combination defined in claim 1 in which the cross-sectional area of said outlet orifice is about 1/40 that of the material inlet passage to said heat exchanger.

3. The combination defined in claim 1 in which the included angle of said first cone is about 68° and the included angle of the cone defined by the conical inner surface of said inlet member is 76°.

4. The combination defined in claim 1 in which the included angle of said second cone is about 60° and the included angle of the cone defined by the conical inner surface of said outlet member is about 68°.

5. The combination defined in claim 4 in which said angles are about 50° and 70° respectively.

6. The combination defined in claim 1 in which said passageways extending through said heat exchange member are circular in cross-section and have a diameter between 1/2 inch and 1/4 inch.

7. The combination defined in claim 1 in which the combined cross-sectional area of said passageways in said heat exchange member does not exceed 60 percent of the area of said material inlet passageway.

8. Apparatus for pre-heating a free flowing material which apparatus comprises, in combination, a heat exchange member comprising an elongated cylindrical section extending along a longitudinal axis from an entrance end to an exit end, a plurality of parallel cylindrical passages in said section extending from said entrance end to said exit end along symmetrically disposed axes parallel to and equidistant from said longitudinal axis, an annular wall portion attached to and extending from said entrance end for a predetermined distance and surrounding said passages, a first conical portion attached to and extending from said entrance end and having an apex protruding beyond said wall portion, an inlet member attached to and confronting said wall portion, said inlet member having a central cylindrical passage extending along said longitudinal axis and having a cross-sectional area substantially greater than the combined cross-sectional areas of said passages in said cylindrical section, said central cylindrical passage extending toward said entrance end to a terminus beyond the apex of said first cone in the direction from said exit end to said entrance end, a truncated conical passage in said inlet member extending from said terminus to said annular wall, said truncated conical passage having a greater angle of divergence than the apex angle of said first cone, whereby a flow passage is formed for confining molding material flowing from the cylindrical passage in said inlet member into the parallel passages in said cylindrical section, which flow passage increases in cross-sectional area at a first rate between said terminus and the apex of said first cone, increases in cross-sectional area at a second rate lower than said first rate between the apex of said first cone and the juncture of said truncated conical passage and said annular wall portion, and decreases in cross-sectional area between said juncture and said parallel passages, a ram slidably mounted in said central cylindrical passage for forcing a charge of molding material into said flow passage, a second conical portion having a base attached to said exit end within and substantially tangent to said parallel passages and having an apex beyond said parallel passages along said longitudinal axis, and an outlet member attached to the exit end of said cylindrical member and having a truncated conical passage confronting and enclosing said parallel passages and converging at a larger angle of convergence than the apex angle of said second cone in the direction of convergence of said second cone to a terminus adjacent the apex of said second cone, said outlet member having a small cylindrical outlet passage joining said terminus of said conical passage in said outlet member to form an outlet passageway for the discharge of heated and plasticized molding material, and means for heating said heat exchange member.

References Cited by the Examiner
FOREIGN PATENTS
815,286  6/1959  Great Britain.

J. SPENCER OVERHOLSER, *Primary Examiner.*

W. L. McBAY, *Assistant Examiner.*